US012765452B2

(12) United States Patent
Forbes

(10) Patent No.: US 12,765,452 B2
(45) Date of Patent: Oct. 20, 2026

(54) REEL LAWNMOWER FOR MOWING GREENS

(71) Applicant: Turf Equipment Services, LLC, Palm Beach Gardens, FL (US)

(72) Inventor: Tracey Forbes, Palm Beach Gardens, FL (US)

(73) Assignee: Turf Equipment Services, LLC, Palm Beach Gardens, FL (US)

( * ) Notice: Subject to any disclaimer, the term of this patent is extended or adjusted under 35 U.S.C. 154(b) by 402 days.

(21) Appl. No.: 18/470,635

(22) Filed: Sep. 20, 2023

(65) Prior Publication Data

US 2024/0107937 A1 Apr. 4, 2024

Related U.S. Application Data

(60) Provisional application No. 63/376,366, filed on Sep. 20, 2022.

(51) Int. Cl.

*A01D 34/56* (2006.01)
*A01D 34/42* (2006.01)
*A01D 69/00* (2006.01)
*A01D 69/08* (2006.01)
*A01D 101/00* (2006.01)

(52) U.S. Cl.

CPC ............. *A01D 34/56* (2013.01); *A01D 34/42* (2013.01); *A01D 69/005* (2013.01); *A01D 69/08* (2013.01); *A01D 2101/00* (2013.01)

(58) Field of Classification Search

CPC .... A01D 34/015; A01D 34/283; A01D 34/30; A01D 34/42; A01D 34/475; A01D 34/53; A01D 34/56; A01D 69/00; A01D 69/08; A01D 69/005; A01D 69/06

USPC ....... 180/53.1, 299, 19.1; 56/249, 294, 10.3, 56/10.8, 11.1, 11.8, 16.9, 7, 16.4 R, 11.5, 56/11.2, 254, 16.7, DIG. 17, 11.4, 14.7, 56/17.1, 252; 192/70.13; 474/114; 476/26; 16/437; D15/16; 172/103; 37/243

See application file for complete search history.

(56) References Cited

U.S. PATENT DOCUMENTS 1,670,645 A * 5/1928 Worthington ........ A01D 34/475 74/405
1,709,791 A * 4/1929 Jerram ................. A01D 34/475 56/11.1

(Continued)

FOREIGN PATENT DOCUMENTS

EP 2082640 A1 * 7/2009 ........... A01D 43/063
EP 2229809 9/2010

OTHER PUBLICATIONS

"Designing Sheet Metal Notches, Tabs, and Slots", Protolabs, Sep. 13, 2022 https://www.protolabs.com/resources/blog/designing-sheet-metal-notches-and-tabs/ (Year: 2022).*

(Continued)

*Primary Examiner* — Christopher J Sebesta
*Assistant Examiner* — Sunny D Webb
(74) *Attorney, Agent, or Firm* — McHale & Slavin, P.A.

(57) ABSTRACT

A reel mower particularly adapted for mowing portions of a golf course, such as greens and tees, is provided. It is self-propelled by a motor with a ground engaging drive system that allows at least one drive member to freewheel during turns. It is also provided with a toolless means to adjust cutting height.

15 Claims, 12 Drawing Sheets

(56) References Cited

U.S. PATENT DOCUMENTS

| | | | | | | |
|---|---|---|---|---|---|---|
| 1,722,730 | A | * | 7/1929 | Buday | A01D 34/475 | 56/12.6 |
| 1,749,189 | A | * | 3/1930 | Mack | A01D 34/475 | 56/10.8 |
| 1,836,359 | A | * | 12/1931 | Blydenburgh | A01D 34/475 | 192/48.8 |
| 1,902,524 | A | * | 3/1933 | Roth | A01D 34/475 | 180/19.1 |
| 2,041,126 | A | * | 5/1936 | George | A01D 34/475 | 56/11.5 |
| 2,053,535 | A | * | 9/1936 | Schielein | A01D 34/58 | 180/19.1 |
| 2,152,252 | A | * | 3/1939 | Godwin | A01D 34/62 | 56/249.5 |
| 2,204,254 | A | * | 6/1940 | Moyer | A01D 34/475 | 172/103 |
| 2,226,896 | A | * | 12/1940 | Cooper | A01D 34/475 | 56/11.8 |
| 2,871,647 | A | * | 2/1959 | Schrade | A01D 34/475 | 301/6.5 |
| 2,881,887 | A | * | 4/1959 | Faas | F16D 21/02 | 192/48.8 |
| 3,207,251 | A | * | 9/1965 | Putnam | F16D 13/46 | 192/49 |
| 3,759,022 | A | * | 9/1973 | Snyder | A01D 57/01 | 56/294 |
| 3,979,887 | A | * | 9/1976 | Stewart | A01D 34/412 | 241/236 |
| 4,481,757 | A | * | 11/1984 | Tsuchiya | A01D 34/42 | 56/16.9 |
| 4,644,737 | A | * | 2/1987 | Arnold | A01D 34/42 | 56/7 |
| 5,265,404 | A | * | 11/1993 | Aldred | A01D 34/42 | 56/249.5 |
| 8,161,720 | B1 | * | 4/2012 | Humphrey | A01D 42/00 | 172/21 |
| 8,261,523 | B2 | * | 9/2012 | Patton | A01D 34/53 | 56/13.5 |
| 8,356,465 | B2 | * | 1/2013 | Hallale | A01D 34/54 | 56/17.2 |
| 2009/0188230 | A1 | | 7/2009 | Percy et al. | | |
| 2021/0321562 | A1 | | 10/2021 | Langworthy et al. | | |

OTHER PUBLICATIONS

Anonymous, "Designing laser cut tab and slot parts video & guide", SendCutSend, Internet article retrieved Mar. 15, 2024, https://sendcutsend. com/blog/designing-laser-cut-tab-and-slot-parts/ (Feb. 2022).

* cited by examiner

REEL LAWNMOWER FOR MOWING GREENS

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 63/376,366, entitled "REEL LAWNMOWER FOR MOWING GREENS", filed Sep. 20, 2022. The contents of the above referenced application is incorporated herein by reference in its entirety.

FIELD OF THE INVENTION

A reel lawnmower is provided that is particularly adapted to mowing short grass, such as golf course greens and tees. It provides for enhanced turning ability and cutting height adjustment. Maintenance is also improved.

BACKGROUND OF THE INVENTION

Reel lawnmowers are well known in the art. They can either be a push type mower where the operator provides the power (or energy) to operate the reel which is driven by wheel rotation to effect grass cutting, or they can be powered with a motor, such as an internal combustion engine, to power the reel and optionally provide for self-propelled operation. The powered type mower typically uses a motor, such as an internal combustion engine, to power operation, but can optionally be powered with an electric motor that can receive energy from a battery or from a plug-in power cord.

Reel lawnmowers are particularly effective at precise height cutting of short grass that is cut often, needing only a small length trimmed off during a mowing. This makes it a mower type of choice for golf courses, particularly for greens and tees.

Reel mower's cutter blades are mounted on a horizontal shaft and revolve about the axis of rotation of the shaft. The blades can also create an updraft that makes the grass stand up so it can be cut and then discharged. The reel cutter blades are helically disposed along the length of the reel and cooperate with a bed knife to provide a scissor like shearing action to cut the grass. The number of blades can be between about 5 and about 15. By contrast, rotary mowers cut by high-speed impact of a horizontally rotating blade that has a pair of opposed cutting edges that impact the grass to effect cutting. Thus, reel mowers have a better quality cut than rotary mowers, which is important for greens and tees. Reel mowers are preferred for lower mowing heights (for example, under an inch), whereas rotary mowers perform better at higher mowing heights. Reel mowers are more effective when the grass is not too long, wet or undulating. Because of the shearing cutting action, reel mowers have difficulty cutting twigs and other coarse materials, and can jam or be damaged by hard objects such as rocks and woody stems. Reel mowers work best on warm season grasses, such as St. Augustine, zoysia, bentgrass and bermudagrass due to the coarse texture of the varieties, making it easier to cut. Such grasses are found on golf courses. Rotary mowers can cut a wide variety of grass species and heights.

Reel mower blades work like scissors on a lawn. For this reason, the blades need to be regularly, precisely sharpened—typically annually for homeowners—and their spacing from the bed knife needs precise adjustment relative to the cutter blades on the reel.

As used herein, orientation terminology is used in the sense of having the mower on a flat level surface. In actual use, the surface on which such a mower is being operated will likely be neither flat nor level. Also, orientation terms are used in the sense of forward being in the normal direction of movement for mowing.

DESCRIPTION OF THE PRIOR ART

Reel mowers are the mower type of choice on golf courses, particularly for green and tee grooming. They are also used on fairways, where they are typically used in a gang arrangement to effect wide swath cutting where cutting need not be as precise. Greens and tees, however, are smaller and the quality of the cut of the grass is much more important, particularly on greens. Such mowers are self-propelled, utilizing at least two drive elements, such as wheels or drums, for support of the mower and to effect self-propelled driving of the mower. Rollers are typically used to control cutting height. The height of the roller(s) is adjustable to allow for cutting height adjustment. Height adjustment is adjustable one side at a time using tools, and would typically be set at a maintenance shop before taking the mower out for use. Making adjustment on the course would require taking tools out on the course and then making adjustment on an uneven terrain, making it possible to not have a uniform height across the width of the mower. Uniform cutting height is particularly important on greens, and also reduces uneven cutting heights between swaths at the cut overlaps.

Self-propelled mowers drive the wheels or drums to propel the mower forward. The wheels or drums also help support the weight of the mower and are positioned aft of the reel and bed knife. This prevents bending the grass down prior to cutting and thus avoiding a possible uneven cut height. Driving all the wheels or drums during straight line operation is needed to ensure good traction for effective powered propulsion for forward driving to help prevent slippage between the wheels/drums and the underlying grass, and thereby damage to the grass and underlying ground. During cutting, the mower has to be turned. The wheel or drum on one side of the mower will skid on the grass, making turning difficult and tiring for the operator, and again, possible damage to the grass and underlying ground from the slippage.

Mowing produces debris, such as grass clippings and dirt, that can travel to drive elements and foul them from proper operation. It is important to provide a drive train that can operate effectively in such environments without the need for undesired maintenance, particularly when out on the golf course. Mowing is done on a tight schedule and must be completed on time to allow full time usage of the golf course.

It is thus desired to provide a mower that will allow positive driving of all the wheels/drums during propelled driving while allowing the wheels/drums on one side of the mower to freewheel to reduce driving slippage with the grass during a turn.

SUMMARY OF THE INVENTION

Accordingly, it is a primary objective of the present invention to provide an improved reel mower with improved turning capability.

It is a further objective of the present invention to provide such a mower that has improved operation in the presence of debris during mowing.

It is yet another objective of the present invention to provide such a mower that can provide toolless cutting height adjustment.

It is a still further objective of the invention to provide such a mower that can adjust cutting height on both sides of the mower simultaneously.

Other objects and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 10:
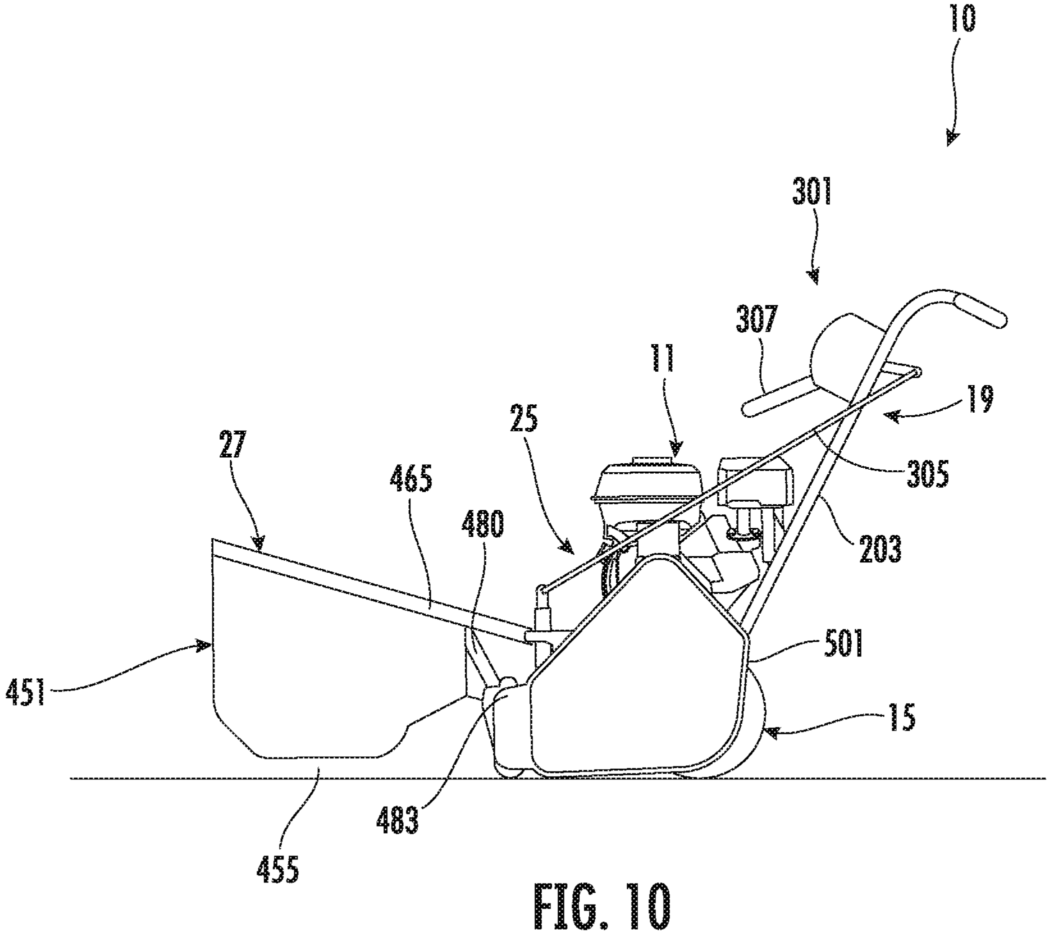
FIG. 10 is a side elevation view of the mower.
Figure 11:
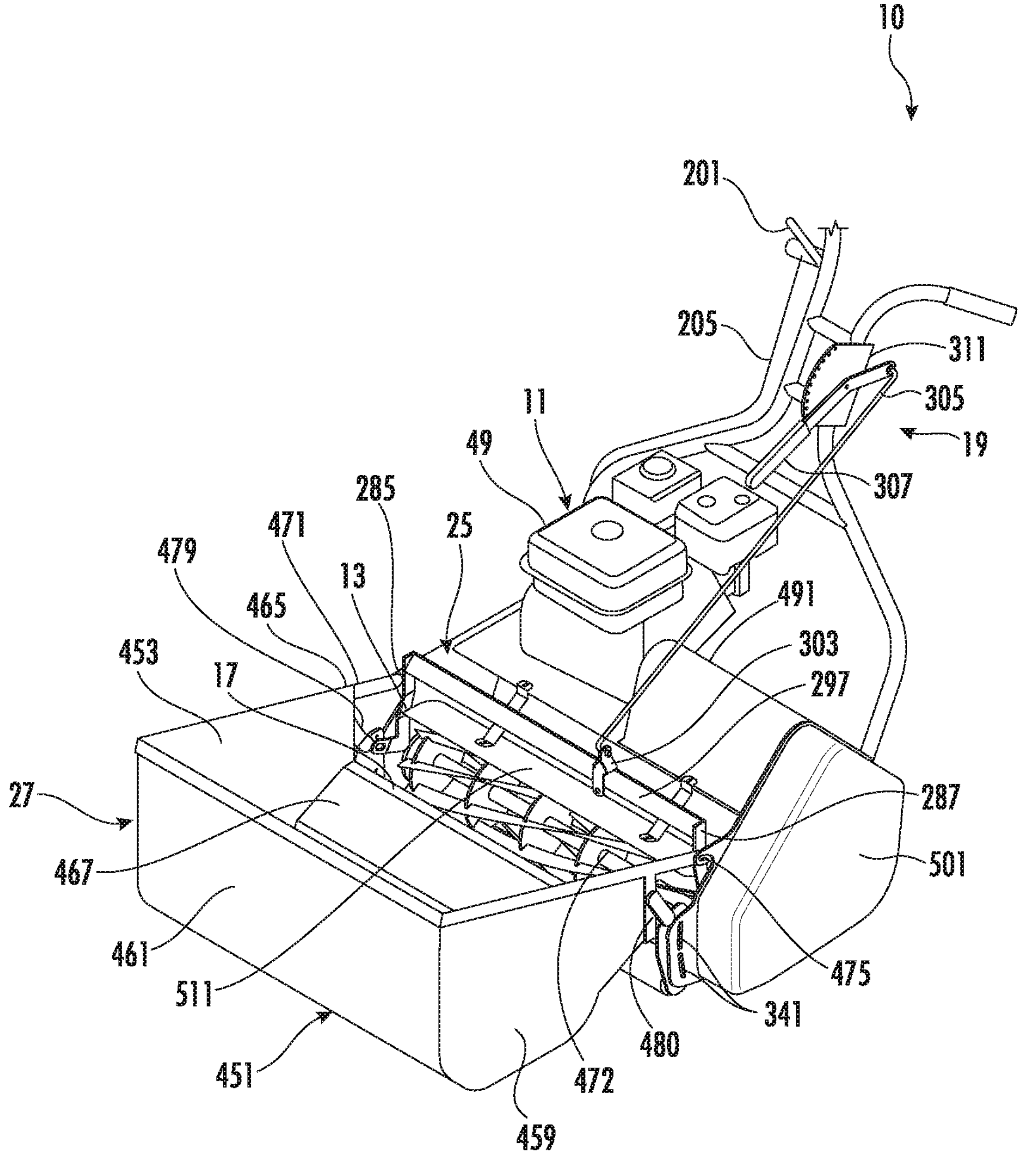
FIG. 11 is a perspective view of the mower.

Referring to FIGS. 10 and 11, the mower 10 of the present invention is a reel mower and can have seven major sections. The mower 10 includes a power source 11 operable to power propel the movement of the mower and effect rotation of the reel 13 for cutting of grass. The mower 10 also includes a transmission 14 (FIGS. 2-6) that operably couples the power source 11 to the reel 13 and traction drive section 15 to propel the mower during operation. Also provided is a cutting head 17 that includes the reel 13 and other components to effect grass cutting. A control section 19 is also provided that is operable to selectively effect powering of the cutting head 17 and the drive section 15. Also provided is a cutting height adjustment section 23. A frame 25 is provided to hold the various sections as an assembly for operation of the mower 10. It is desirable to also provide an optional grass clipping collection section 27.

The frame 25 is comprised of an assembly of a plurality of plates secured together to form a rigid assembly. As shown, there are three plates, a top plate 31 and two spaced apart side plates 33, 35. In a preferred embodiment, the plates 31, 33, 35 can be a welded assembly that rigidly fixes the positions of the plates relative to one another. As shown, opposite ends 37, 38 have projecting ears 39 that are each received in a respective through slot 41 in the respective plate 33, 35 to facilitate fixing the relative positions of the plates 31, 33, 35 for welding. Alternatively, brackets (not shown) could be used for joining the plates by welding, or could be used to form the assembly of the plates with threaded fasteners, such as bolts and nuts. The plates 31, 33, 35 are preferably generally planar with the plates 33 and 35 being spaced apart and generally parallel, while the top plate 31 is generally perpendicular to the side plates 33, 35. The top plate 31 is provided with through openings 45 to effect removable mounting of the power source 11 (hereinafter motor for convenience) thereto, as with threaded fasteners 47, such as nuts and bolts. The motor 11 is shown as an internal combustion engine with an associated fuel tank 49. It is to be understood that the motor 11 could be an electric motor with an associated battery (preferably a rechargeable battery), or could be powered with a plug in cord. The motor 11 has an output shaft 51 that is suitably coupled to the transmission 14 with a separable coupler 53 to facilitate power source removal for maintenance and the like. A preferred coupler 53 can be operable to help accommodate some misalignment between the output shaft 51 and an input shaft 61.

The motor 11 is coupled to the transmission 14 via the coupler 53. The transmission 14 includes an input shaft 61 that has a coupler 53 portion secured thereto. The input shaft 61 is mounted to the frame 25 for rotation by the motor 11. As shown, the side plate 35 has a through bore 63 that receives the input shaft 61 therethrough. The input shaft 61 is rotatably mounted in a bearing 65 that is mounted to the side plate 35 with a flanged bearing retainer 67 with a bearing counterbore 68 with threaded fasteners 69 such as nuts and bolts. A portion of the shaft 61 has a drive element 71, such as a sprocket, mounted thereon. As shown, the drive element 71 is positioned outboard of the plate 35.

The transmission 14 includes a drive clutch assembly, designated generally 81, that is operable to effect selective driving of the reel 13 and drive section 15. In a preferred embodiment, the clutch 81 is operable to simultaneously effect driving of the reel 13 and the drive section 15. It is to be noted that a pair of separately operated clutches could be used, each operable by a separate controller instead of a common controller.

While the transmission 14 is shown as being configured to utilize a sprocket and chain arrangement of drive components, it is to be understood that gear arrangements, pulleys and belts, and combinations thereof could be used. The drive element 71 is operably connected to a main driven drive element 81, such as a sprocket, via a drive coupler 80, such as a chain. The driven drive element 81 has a pair of opposing clutch friction faces 83, 84, whereby the drive element forms a double sided friction plate. Each of the faces 83, 84 is operable to engage a respective clutch disc 85, 87 to selectively couple and decouple the drive element 71 to drive the reel 13 and traction drive section 15 for driving and idle as described below. A driven drive element 91, such as a sprocket, has a friction face 93 facing the face 84 with a clutch friction disc 87 positioned between the faces 84, 93. The clutch friction disc 87 is held against lateral radial movement as by a rib, not shown, extending from one of the faces 84, 93. The driven drive element 91 is drivingly coupled to a driven drive element 101, such as a sprocket, that is operably connected to portions of the drive section 15 via a drive coupler 103, such as a chain.

Figure 6:
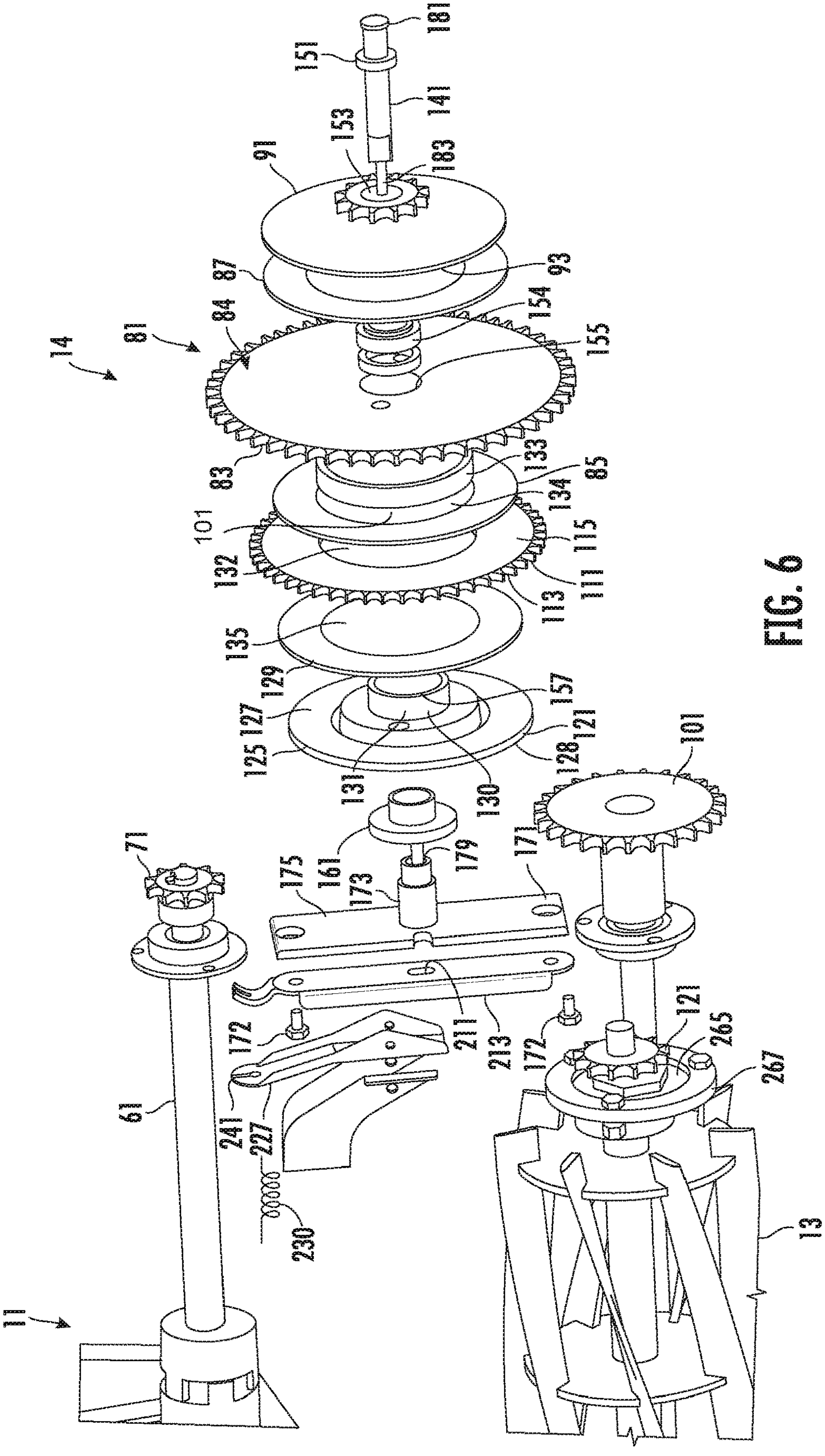
FIG. 6 is an exploded fragmentary perspective view showing components of a clutch assembly.
Figure 7:
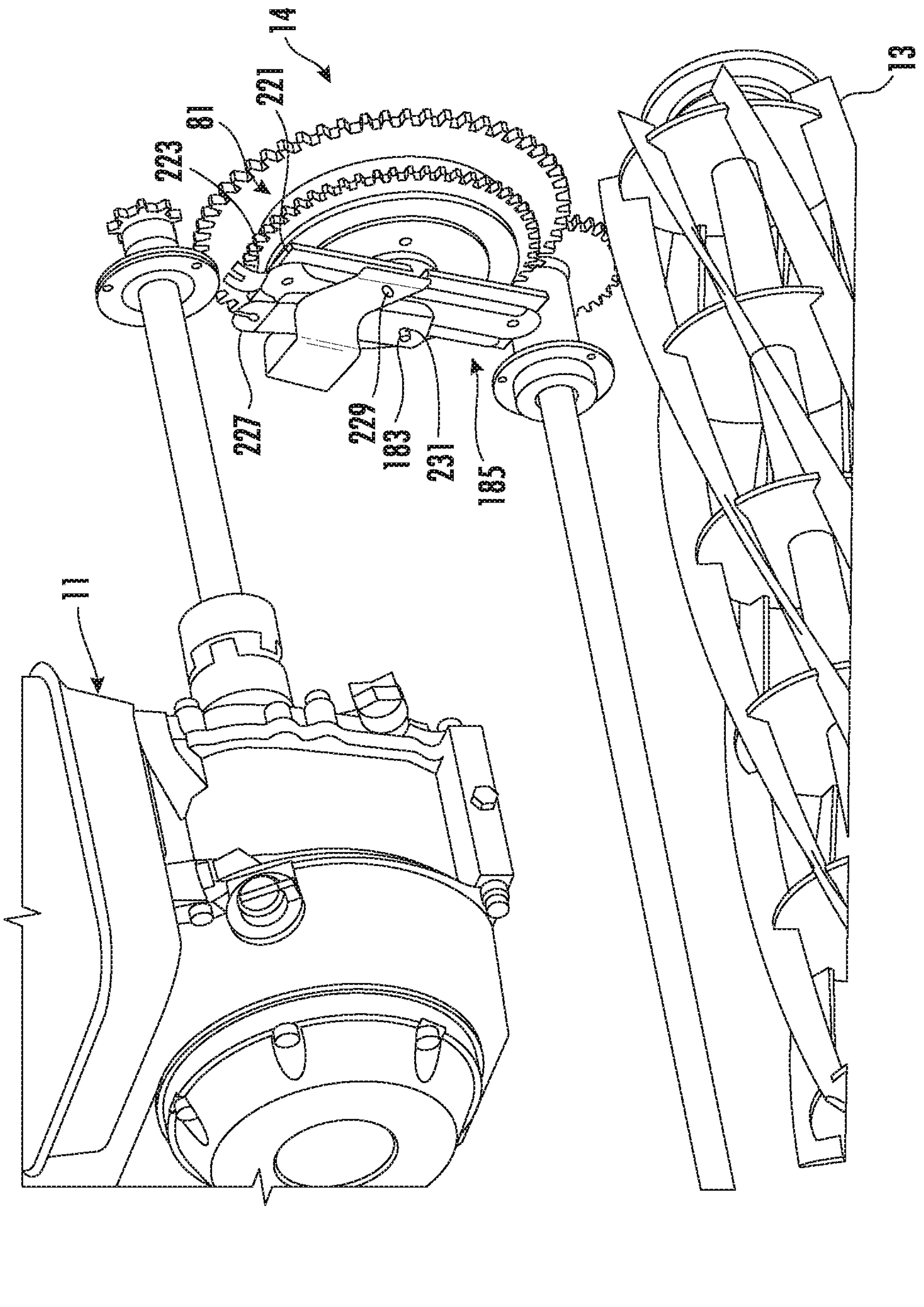
FIG. 7 is a fragmentary perspective view of the power source, transmission and reel.
Figure 8:
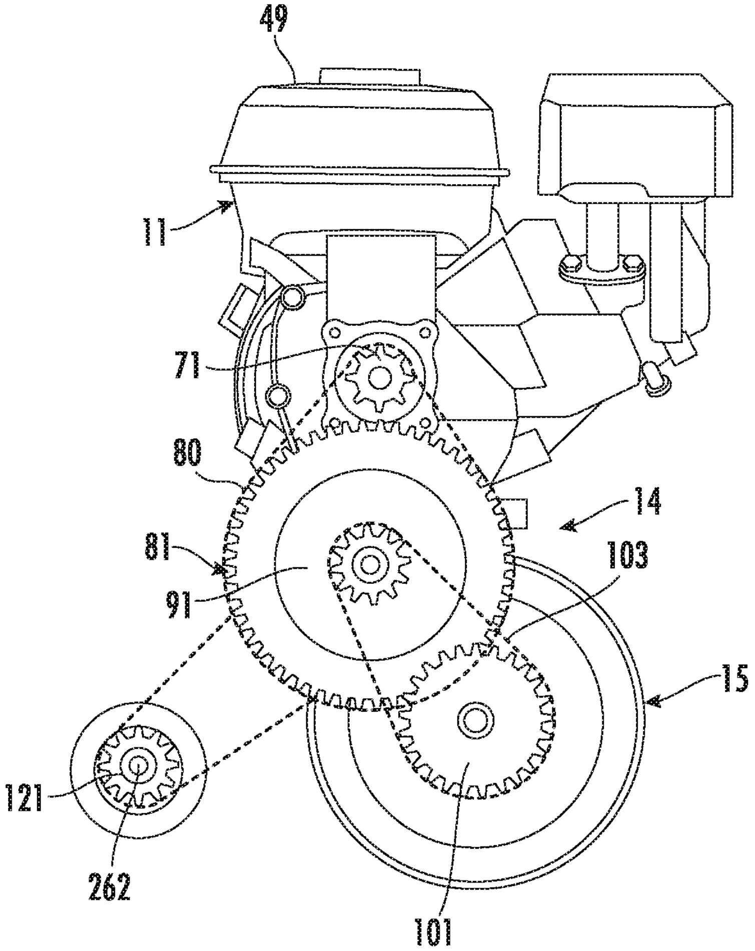
FIG. 8 is an end view showing the power source and transmission.

The transmission 14 is also operable to selectively drive the reel 13. As best seen in FIG. 6, a drive element 111, such as a sprocket, has a pair of opposed friction faces 113, 115.

The face 115 faces face 83 and a clutch friction disc 85 lies therebetween. The friction disc 85 is selectively engageable with the faces 115 and 83 and, when engaged, the drive element 111 will be power driven by the drive element 81, which will then drive an associated drive element 121 to selectively effect rotation of the reel 13. In the illustrated embodiment, a support hub 125 is provided having a friction face 127 facing the friction face 113 with a friction disc 129 positioned therebetween. The disc 129 is selectively engageable with the faces 127 and 113 to help effect driving of the drive element 111 to effect driving of the reel 13. The hub 125 has a flange portion 128 that includes the friction face 127. A hub portion 130 having a through bore (not shown) projects from the flange portion 127 and forms a bearing retainer 131. The drive element 111 also has a through bore 132 through which a ring collar 133 extends. The friction discs 85 and 129 receive the collar 133 therethrough through central openings 134, 135, respectively. The drive element 111 also receives the collar 133 through its central opening 132. The collar 133 limits radial lateral movement of the friction discs 85, 129 and the drive element 111.

The transmission 14 includes a support shaft 141 that extends through the drive elements 111, 91 and 81 to effect rotational mounting thereof. This mounting is also effective to permit guided movement of the drive and driven elements 81, 91 and 111 toward and away from one another to effect selective clutch activation to selectively effect driving of the reel 13 and drive section 15. A bearing 151 mounted in a retainer portion 153 in the drive element 91 mounts the drive element 91 to the shaft 141. A bearing 154 mounted in a through bore 155 in the drive element 81 mounts the drive element 81 to the shaft 141. A bearing 157 is mounted in the hub portion 130 and mounts the support hub portion 130 to the shaft 141. The shaft 141 extends through a spacer 161 that is received in the hub portion 130 to help maintain the longitudinal position of the transmission 14 relative to the side plate 33 of the frame 25 and prevent contact during rotation of the support hub portion 130.

A bracket 171 is suitably mounted to the side plate 33 as with threaded fasteners 172, such as nuts and bolts. A protuberance 173 extends from a base 175 and through an opening 177 in the side plate 35. A spacer 161 is mounted on the protuberance 173. The shaft 141 extends through a through bore 179 in the protuberance 173 and base 175. The shaft 141 has a head 181 on its free end that limits longitudinal movement of the shaft through the clutch parts assembly. The opposite end 183 of the shaft 141 is operably associated to a clutch control operator 185, which is described below.

The clutch control operator 185 has an operator device 201, preferably a pivotally mounted lever mounted in a convenient location, such as on a handle bar 203 that is secured to the frame 25. Mounting of the handle bar 203 to the frame 25 can be a pivotal mount or a fixed mount, and can be fixed in a selected pivotal position. The operator device 201 is operably connected to the shaft 141 with a link 205, such as a flexible cable. A rigid bar could also be used, as could an electrical device such as a solenoid actuator in combination with a switch and wire arrangement. The link 205 has a portion operably connected to the end 183 of the shaft 141 and, when the link is tensioned, the clutch assembly is compressed, causing the various friction faces of the discs 85, 87, 129 to engage the drive elements 81, 91, 111 to selectively effect driving of the drive elements 91 and 111, which in turn drive the reel 13 and drive section 15. As shown, the end 183 of the shaft 141 extends through an opening 211 in a connector plate 213. In a preferred embodiment, the link 205 includes a cable assembly including a cable 215 enclosed in a housing 217. The cable 215 has an attachment end with an enlarged connector fitting 219. The connector plate 213 has an arm 221 with a notch 223 that receives a portion of a cable 215 therein with the fitting 219 preventing cable pull through. The cable housing 217 has a free end 225. A lever 227 is pivotally mounted on the plate 213, as at 229, forming a fulcrum. The shaft end 183 extends through an opening 231 in the lever 227 and is spaced a distance from the pivot point 229, such that pivoting movement of the lever 227 will effect longitudinal movement of the shaft 141 to selectively effect clutch driving and clutch release of the transmission 14. A notch 241 is provided in the lever 227 to receive the cable 215 therethrough. The end of the cable housing 225 engages the lever 227 at the notch 241, such that operation of the operator device 201 causes the lever 227 to pivot and the clutch components to engage and effect driving of the reel 13 and drive section 15. A spring return is preferably provided, whereby release of the operator device 201 will allow the spring 230 to pivot the lever 227, allowing the clutch components to disengage and stop driving of the reel 13 and drive section 15.

While a preferred transmission 14 with clutch assembly is shown, it is to be understood that other forms could be utilized. The function of the transmission 14 is multi-function, such as two-fold, to provide selective driving of both the reel 13 and drive section 15 and to be able to drive them at different rotational speeds. One other form of clutch assembly is a centrifugal clutch; while another option would be to use a belt and pulley with a belt tensioning idler pulley for each clutch and drive component. Combinations of such alternatives can also be used.

The cutting head 17 includes the reel 13 and other components, including a bed knife 263 to effect grass cutting by shearing during rotation of the reel 13. The reel 13 is rotatably mounted to the frame 25. As shown, the reel 13 has a central longitudinal shaft 262 to which the blades 261 are attached, with the blades extending helically along the length of the reel 13. The blades 261 are positioned to effect shearing action of grass between the blades 261 and the bed knife 263 as is known in the art. The bed knife 263 is also removably mounted to the frame 25 in a manner (not shown) to allow its position to be adjusted relative to the position of the blades 261 on the reel 13. The reel 13 is mounted to the frame 25, preferably with a bearing 265 mounted to each of the side plates 33, 35 with suitable bearing retainers 267 removably secured to a respective side plate as with threaded fasteners 269, such as bolts and nuts. A drive element 121, such as a sprocket, is mounted to the shaft 262 and is drivingly coupled to the transmission 14 by a drive member 273, such as a drive chain coupled to the driven elements 121 and 111. The gear ratio between the driven elements 111 and 121 is selected to provide a desired rotational speed of the reel 13 given the rotational speed of the motor output shaft 51. In the illustrated structure, the position of the reel 13 is fixed on the frame 25, while the position of the bed knife 263 is adjustable. It is to be understood that the position of the reel 13 could be adjustable relative to the bed knife 263, while the position of the bed knife 263 could be fixed.

Figure 1:
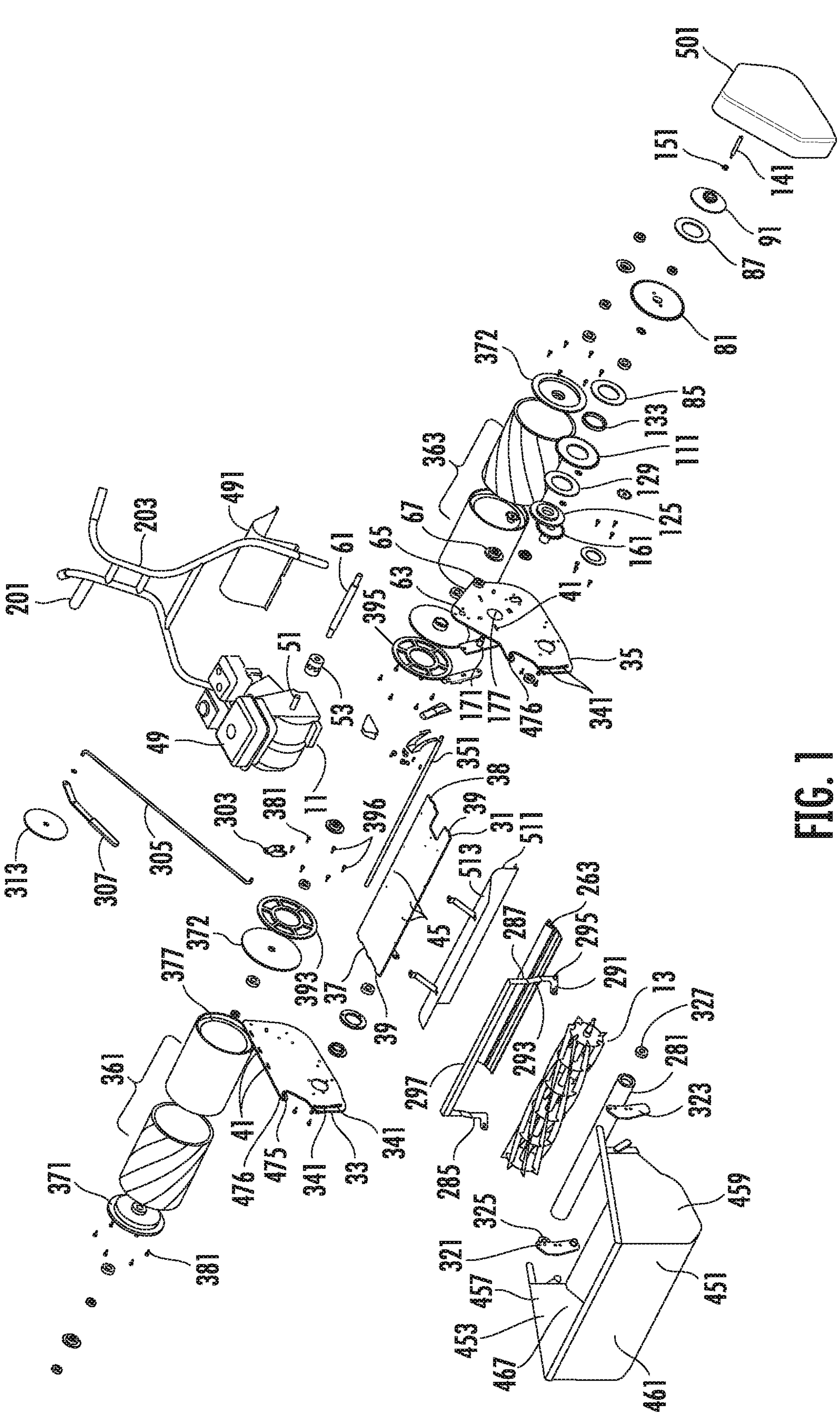
FIG. 1 is an exploded perspective view of the mower.

At least one cutting height fixing member is provided to allow setting and fixing of the cutting height of the reel 13 and bed knife 263. As is known in the art, the cutting height is controlled with a rotatable roller 281 (FIGS. 1, 9) suitably mounted to the frame 25 in a manner to allow its selective movement to adjust and fix cutting height. Cutting height on a green is on the order of about 1". Typically, such a mounting arrangement involves independent adjustment of each end of the roller 281 and requires tools. This is inconvenient if adjustment is to be done while the mower is on the course. Additionally, not all greens and tees on a given course are mowed to the same height. In the case of the inventive mower, the roller 281 is mounted in a manner to allow toolless height adjustment of both ends of the roller 281 simultaneously and without tools. The mounting is also such that the selected height is displayed and calibrated. As shown, a pair of arms 285, 287 are pivotally mounted to the frame 25, as with a respective fastener, such as a threaded bolt and nut (not shown), each preferably to a respective side plate 33, 35. The arms 285, 287 are of the same shape for manufacturing convenience. As shown, they are generally L-shaped, each having a pair of connected legs 291, 293. In a preferred embodiment, the leg 293 is longer than the leg 291 from a pivot point 295. In the illustrated embodiment, the leg 293 is an actuator leg, while the leg 291 is a responder leg. The legs 291, 293 are connected together by a cross member 297 as by welding to effect simultaneous pivoting movement of the arms 285, 287 relative to the frame 25. As shown, an operator mechanism 301 is coupled to the cross member 297 as with a connector 303 secured to the cross member. A link 305, preferably rigid to allow both positive pushing and pulling, is connected to the connector 303 and links a control operator, such as a handle 307, to the member 297 and hence both arms 285, 287 to effect their simultaneous pivoting movement. The illustrated operator mechanism 301 includes both an operator handle 307 pivotally mounted to the handle bar 203 for operating convenience and a position locking device, designated generally 311. The illustrated locking device 311 includes a locking plate 313 mounted to the handle bar 203, and preferably has the handle 307 pivotally mounted thereon to form an assembly. In the illustrated embodiment, a detent (not shown) is mounted on the handle 307 and is selectively receivable in one of a plurality of spaced apart recesses 315 in the locking plate 313 to selectively fix its pivoted position. The locking plate 313 can be provided with calibrated indicia indicating a corresponding cutting height for each recess 315. Thus, pivoting movement of the handle 307 effects and selectively fixes cutting height adjustment of each end of the roller 281 simultaneously without tools.

A pair of guides 321, 323 is pivotally mounted on the arms 285, 287 as on posts 325 projecting inwardly from a respective guide 321, 323. The roller 281 is also rotatably mounted on the posts 325. As shown, the posts 325 are received in a respective bearing 327, which in turn are each mounted in a recess in an end portion of the roller 281. The guides 321, 323 are each movably mounted to a respective side plate 33, 35 for sliding motion and limited rotational motion. As shown, each side plate 33, 35 has at least one elongate slot 341, generally vertically disposed, therethrough. As shown, each plate 33, 35 has a pair of slots 341, such that when the guides 321, 323 are mounted thereto, rotational movement of each guide is limited. Threaded fasteners (not shown) such as bolts with associated nuts extend through the slots 341 and movably mount the guides 321, 323 to their respective side plate 33, 35. Thus, pivoting movement of the arms 285, 287 via movement of the handle 307 moves the roller 281 up and down for cutting height adjustment, with both ends of the roller 281 moving simultaneously.

The transmission 14 is also operably connected to the drive section 15. The drive section 15 is operable to utilize output from the motor 11 to self-propel the mower 10 at least in a forward direction. As shown, the driven drive element 101, such as a sprocket, is mounted on an axle 351 to effect its selective rotation. The axle 351 is suitably rotatably mounted to the frame 25. As shown, a bearing 353 is mounted to the axle 351 adjacent each of the opposite ends thereof so that the axle can rotate. The bearings 353 are mounted to the frame 25; preferably, to the side plates 33, 35 as with a respective bearing retainer 355 that is secured to the respective plate 33, 35 as with threaded fasteners, such as bolts and nuts (not shown).

Figure 2:
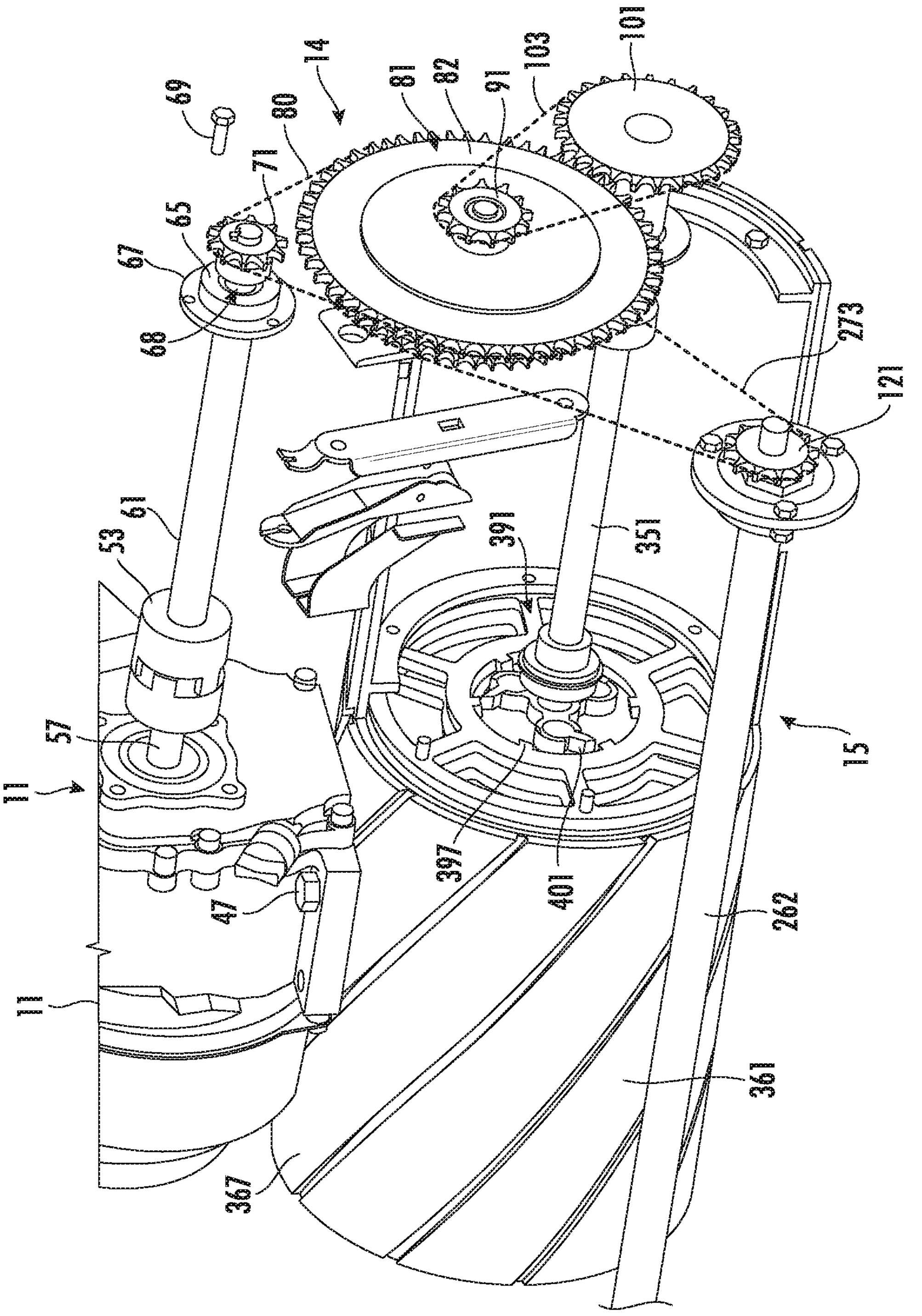
FIG. 2 is a fragmentary perspective view of portions of the transmission and traction drive.
Figure 3:
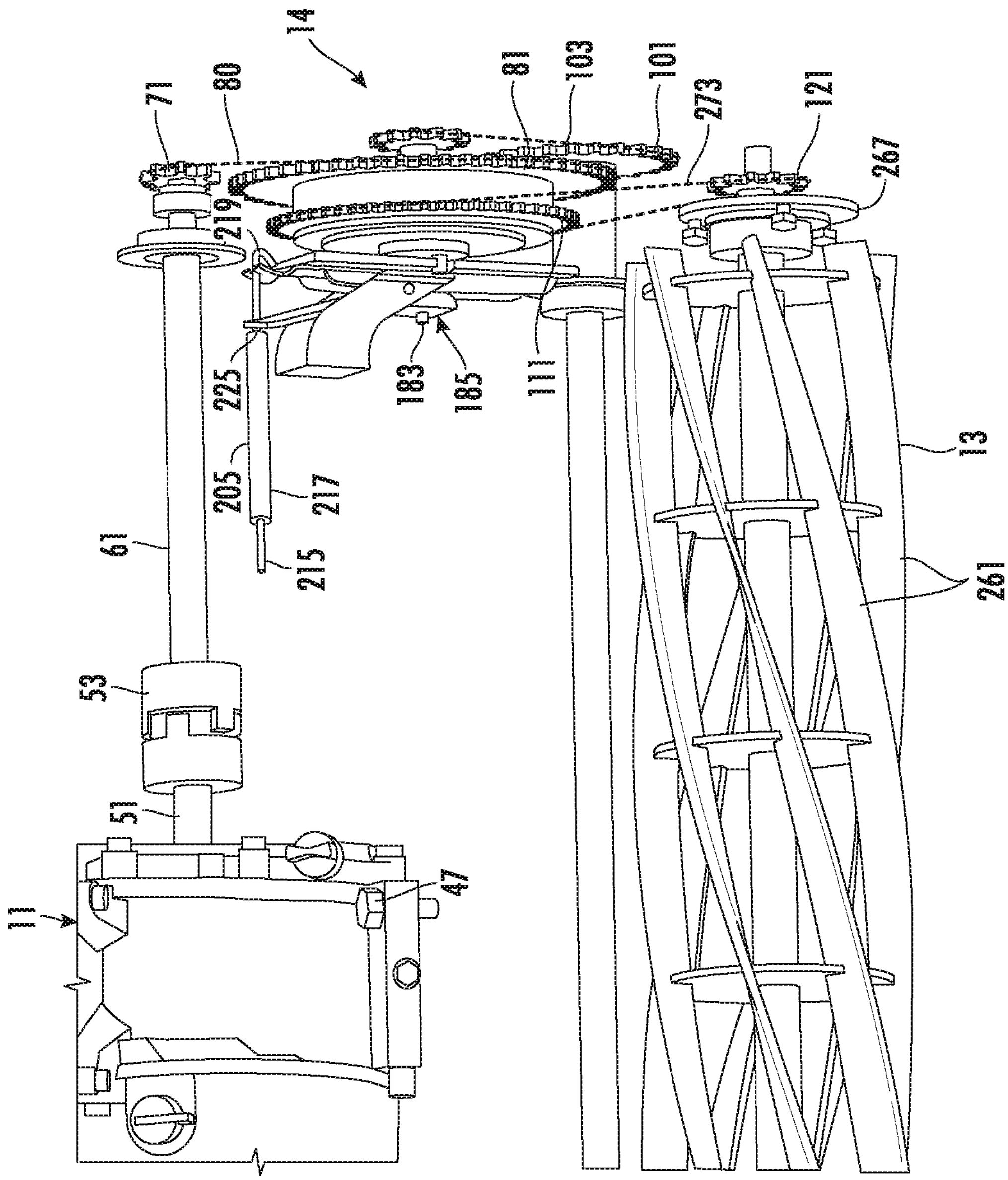
FIG. 3 is a fragmentary perspective view of portions of the transmission and reel.
Figure 4:
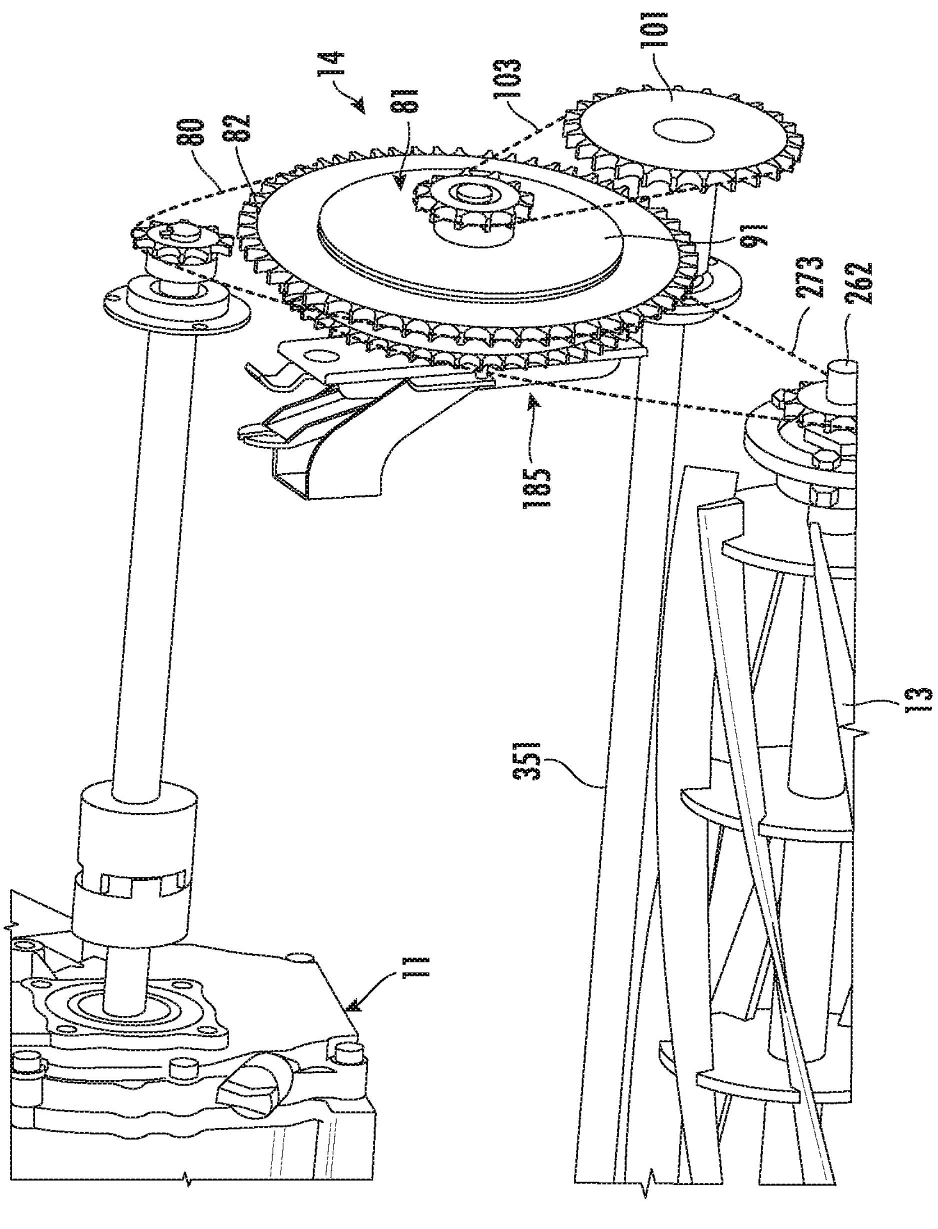
FIG. 4 is an enlarged fragmentary perspective view of the transmission and reel.
Figure 5:
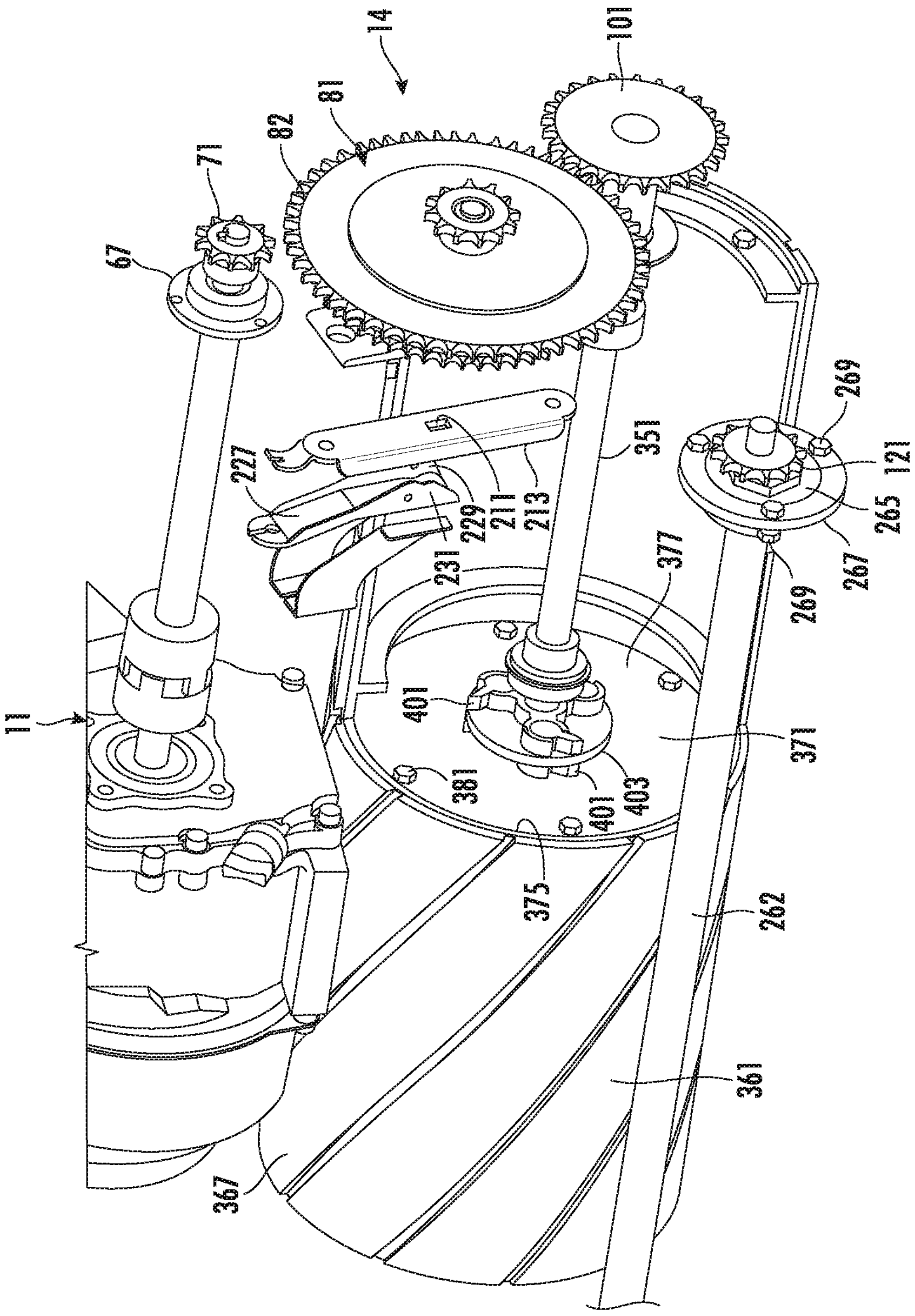
FIG. 5 is a fragmentary perspective view of the transmission and drive section components.
Figure 9:
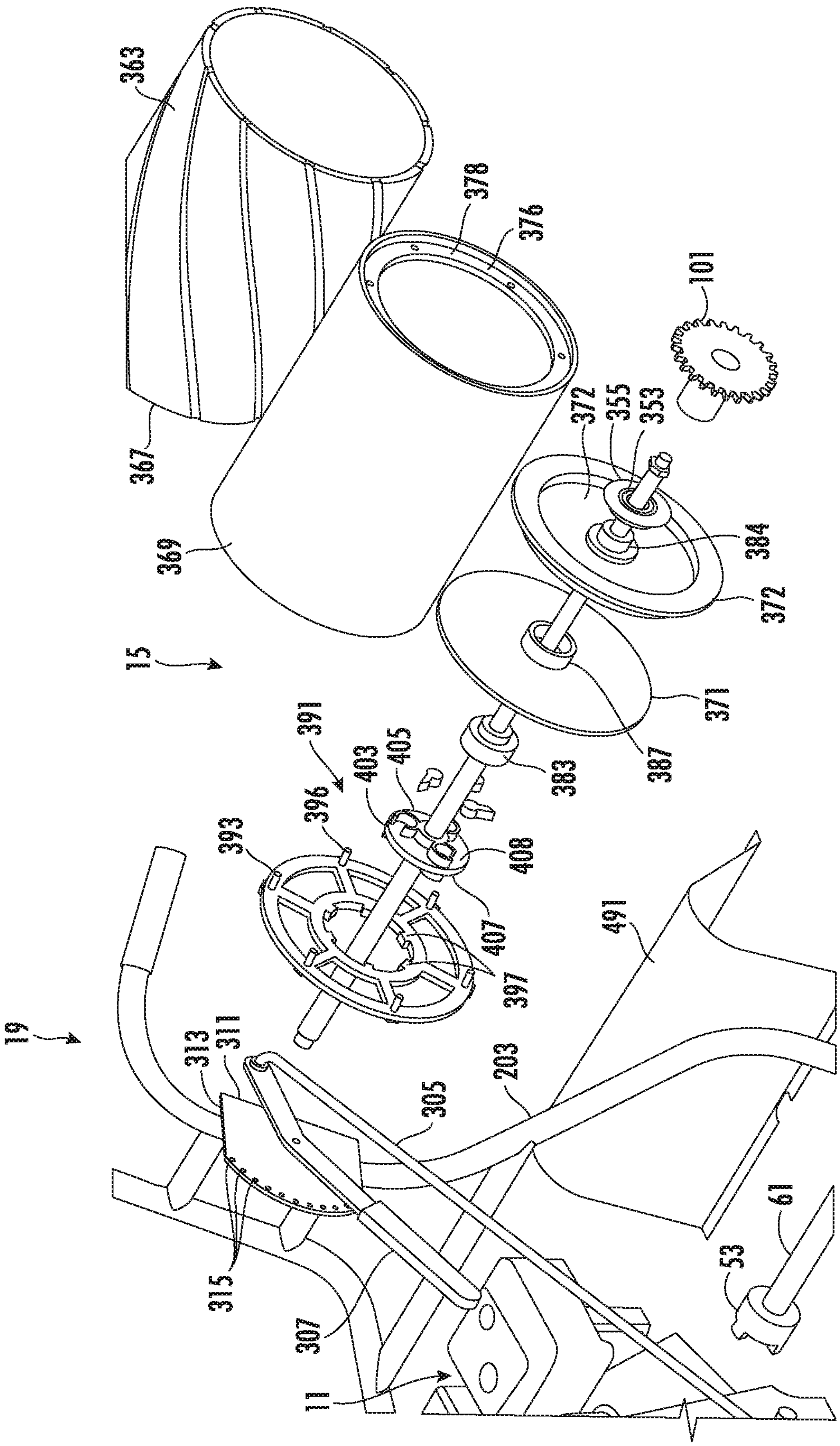
FIG. 9 is an enlarged fragmentary perspective view of drive section components.

In the illustrated embodiment, the drive section 15 includes a pair of driving traction members 361, 363 mounted on the axle 351, each adjacent to a respective side plate 33, 35 (FIGS. 2, 5, 9). The traction members 361, 363 can be pneumatic or non-pneumatic tires on rims. It is preferred that they be permanently relatively rigid to maintain a selected cutting height and not be deflatable, as with a flat or low tire. As shown, the traction members 361, 363 are in the form of elongate drums and are of the same general construction; therefore, a description of one will suffice for a description of the other. A traction member 361, 363 includes an outer tread sleeve 367 mounted on a drive drum 369 in a manner to prevent relative rotation, but allow the installation of a new tread sleeve 367. The drum 369 is rotatably mounted on the axle 351 as with a pair of hubs 371, 372. The hubs 371, 372 are received within a respective recess 375, 376 positioned adjacent a respective end of the drum 369. The recesses 375, 376 are partially defined by an inwardly extending flange 377, 378 and allow removably attachment of the hubs 371, 372 to the drum 369 as with threaded fasteners such as screws 381.

The drum 369 is mounted on the axle 351 for selective relative rotation and selective non-relative rotation. As shown, bearings 383, 384 are mounted on the axle 351 and the respective hub 372, 371. The bearing 383 is removably mounted to the hub 371 with a flanged bearing retainer as with threaded fasteners such as screws. The bearing 384 is mounted to the hub 372 as by being received in a housing portion 387 on the hub 371 in a slip fit manner to allow removal of the traction member 361 from the axle 351. Inward movement of a traction member 361, 363 is limited by contact of the bearing 383 with a portion of an overrunning clutch (also called a freewheel or sprag clutch) as described below.

A clutch assembly 391 provides cooperation between the axle 351 and the traction members 361, 363 to effect simultaneous driving of the traction members by the axle 351, but allows either traction member to freewheel during a turning maneuver of the mower 10 to effect driving of the inside traction member while allowing the outside traction member to freewheel. (See FIGS. 1, 2, 5 and 9.) The clutch assembly 391 is a dual side acting assembly, with each side having similar construction. A gear 393, 395 is mounted to a respective traction member 361, 363 and is secured to the traction member as to be rotatable therewith. The gears 393, 395 effect driving rotation of the traction members 361, 363. Securement can be with threaded fasteners, such as screws 396. As shown, the gears 393, 395 are internal gears; each having a plurality of circumferentially spaced apart gear teeth 397 extending inwardly from an inside surface, and each presenting an engagement surface for selective contact with a ratcheting pawl 401. A hub 403 is secured to the axle 351 and is fixed against rotation relative to the axle 351 as with a key, shear pin, or set screw. Preferably, the securement allows for removal to facilitate maintenance and assembly. The hub 403 includes a radially extending flange 405 having opposite faces 407, 408. At least one pawl 401 is mounted on each face 407, 408 and is pivotal thereon. The pawls 401 can be resiliently biased to an outward position to engage a respective tooth 397 to effect driving of a respect traction member 361, 363 in a forward direction. Both traction members 361, 363 are driven forward when the mower 10 is in straight line motion. During a turn, the gear associated with the outside traction member 361, 363 rotates faster on the axle 351 than its associated pawl(s) 401, and thus can freewheel. As shown, each side of the hub 403 has a plurality of pawls 401 pivotally mounted thereon in circumferentially spaced relationship, their spacing correlating to the spacing of the teeth 397. Three pawls 401 on one side and six associated teeth 397 are shown.

Figure 12:
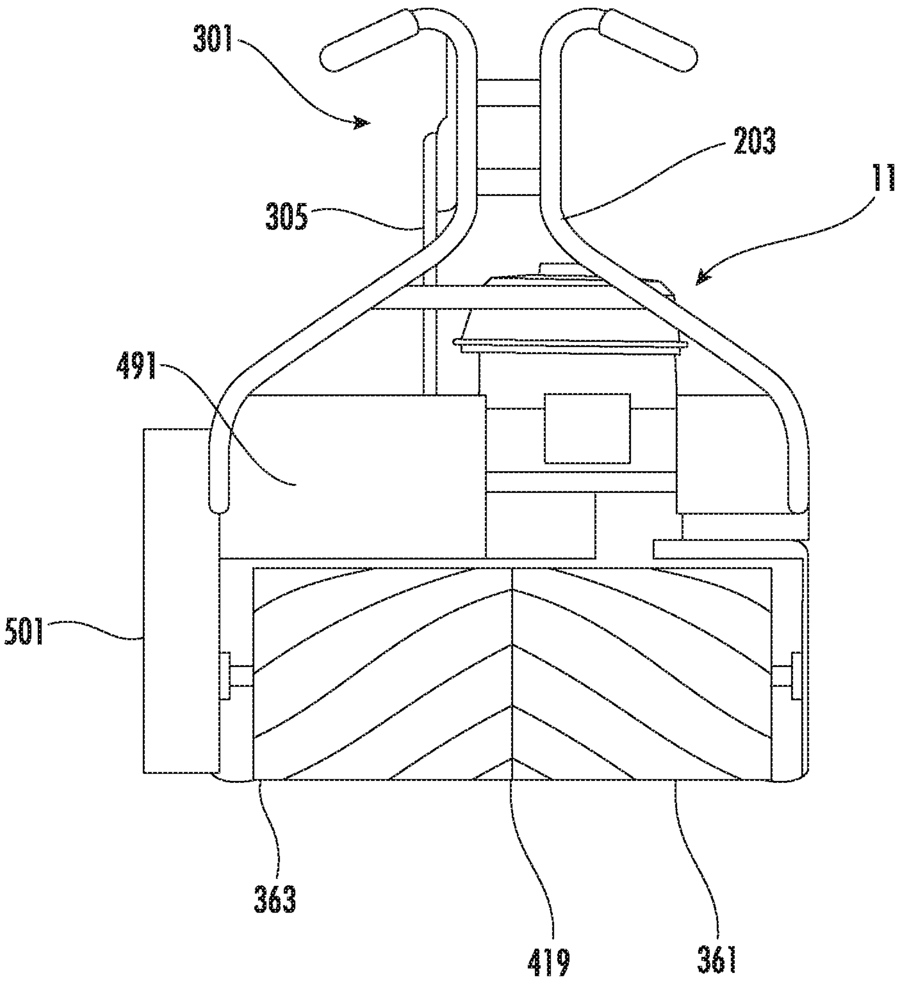
FIG. 12 is a rear elevation view of the mower.

The traction members 361, 363 preferably have a combined length of at least about 75% of the spacing between the inside surfaces of the plates 33, 35. The space 419 (FIG. 12) between the adjacent ends of the traction members 361, 365 is less than about 1" and preferably less than about ½". A space can be provided to allow debris removal as with compressed air.

A grass catcher 451 is removably mounted to the frame 25, and is positioned for receiving cut grass clippings from the reel 13. (See FIGS. 1, 10 and 11.) The catcher 451 has a collection chamber 453 defined by a bottom wall 455, side walls 457, 459 and a front end wall 461. The walls 455, 457, 459 and 461 are connected and can be of a polymeric sheet material, fabric or metal, or combinations thereof. Rigid materials are preferred to maintain shape of the collection chamber 453. In a preferred embodiment, the catcher 451 is mounted in a manner to allow quick disconnect removal and quick connect mounting to the frame 25. As shown, the catcher 451 has a support frame 465 positioned around an open top 467 and is secured to the side walls 457, 459 and the end wall 461. The frame 465 includes a first arm 471, 472 extending from each side of the frame. A catch 475 extends from each of the arms 471, 472 and is receivable in a respective open sided hook portion 476 in the side plates 33, 35. A second arm 479, 480 is pivotally mounted on the frame 465 one each side thereof and has a catch 483 respectively extending therefrom. Each catch 483 is selectively receivable in a respective opening in the side plates 33, 35, respectively, to assist in removably mounting the catcher 451 to the frame 25.

Shields are provided to cover or enclose various moving parts. A shield 491 is removably secured to the frame 25 to cover the coupler 53, shaft 61, bearing retainer 67, drive element 71, and portions of the drive coupler 80. The shield 491 can be secured in place with threaded fasteners (not shown). A shield 501 is removably mounted to the frame 25 as with threaded fasteners (not shown). Shield 501 covers movable portions of the transmission 14. A shield 511 is removably secured to the frame 25, limiting exposure to the reel 13. As shown, it includes a curved laterally extending plate 513 positioned above and behind the reel 13 and provides an additional function of directing discharged grass clippings into the catcher 451.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A reel lawn mower (10) comprising:

a power source (11) operable to power the movement of the reel lawn mower (10) and effect rotation of a mowing reel (13) for cutting of grass, wherein the power source (11) is an internal combustion engine, wherein the internal combustion engine has an output shaft (51) that is suitably coupled to a transmission (14) with a separable coupler (53) to facilitate power source removal, the transmission (14) including a drive clutch assembly (81) that is operable to effect selective driving of the mowing reel (13) and a drive section (15), the drive clutch assembly (81) is operable to simultaneously effect driving of the mowing reel (13) and the drive section (15), the transmission (14) that operably couples the power source (11) to the mowing reel (13) and the drive section (15) to propel the mower during operation, wherein the transmission (14) includes an input shaft (61) that includes a portion of the separable coupler (53) secured to a first end of the input shaft, the input shaft (61) is mounted to a frame (25) for rotation by the internal combustion engine, a drive element (71) is operably connected to an opposite end of the input shaft (61), a drive coupler (80) connects the drive element (71) to a main driven drive element (81), the driven drive element (81) has a pair of opposing clutch friction faces (83), (84), wherein the driven drive element (81) forms a double sided friction plate, a first clutch friction face (83), is operable to engage a respective first clutch disc (85), while a second friction face (84) is operable to engage a second clutch disc (87) to selectively couple and decouple the drive element (71) to drive the reel (13) and drive section (15), a second driven drive element (91) has a friction face (93) facing the second clutch friction face (84) with the second clutch friction disc (87) positioned between the second clutch friction face (84), and the second driven drive element friction face (93), the second driven drive element (91) is drivingly coupled to a third driven drive element (101) that is operably connected to portions of the drive section (15) via a drive coupler (103), a cutting head (17) that includes the reel (13) and other components to effect grass cutting;

a control section (19) that is operable to selectively effect powering of the cutting head (17) and the drive section (15); and the frame (25) to hold the various sections as an assembly for operation of the reel lawn mower (10) wherein the frame (25) is comprised of an assembly of three plates secured together to form a rigid assembly, a top plate (31) and two spaced apart side plates (33), (35) wherein the three plates (31), (33), (35) are a welded assembly that rigidly fixes the positions of the three plates relative to one another and wherein opposite ends (37), (38) of the top plate (31) has projecting ears (39) that are each received in a respective through slot (41) in the respective side plate (33), (35) to facilitate fixing the relative positions of the three plates (31), (33), (35) for welding.

2. The reel lawn mower (10) of claim 1 wherein the drive elements (71), (81), (91), and (101) are sprockets, while the drive couplers (80) and (103) are chains.

3. The reel lawn mower (10) of claim 1 wherein the drive elements (71), (81), (91), and (101) are pulleys, while the drive couplers (80) and (103) are belts.

4. The reel lawn mower (10) of claim 1 wherein the transmission (14) is also operable to selectively drive the mowing reel (13), a second drive element (111) has a pair of opposed drive element friction faces (113), (115) arranged so that a first drive element friction face (115) opposing first clutch friction face (83) and a clutch friction disc (85) lies therebetween, the clutch friction disc (85) is selectively engageable with the first drive element friction face (115) and the first clutch friction face (83) and, when engaged, the drive element (111) is power driven by the drive element (81), which will then drive an associated drive element (121) to selectively effect rotation of the mowing reel (13).

5. The reel lawn mower (10) of claim 4 including a clutch operator device (201) for selectively engaging the first clutch disc (85) and second clutch disc (87) effecting driving of the driven drive elements (91) and (101), which in turn drive the mowing reel (13) and drive section (15).

6. The reel lawn mower (10) of claim 5 wherein the clutch operator device (201) is a pivotally mounted lever mounted to the frame (25), wherein the clutch operator device (201) is operably connected to a shaft (141) with a link (205), the link (205) has a portion operably connected to an end (183) of the shaft (141) so that when the link (205) is tensioned, the drive clutch assembly (81) is compressed, to selectively effect driving of the drive elements (91) and (111), drive element (91) connected to driven drive element (101) via drive coupler (103) to power the drive section (15), drive element (111) connected to associated drive element (121) via drive member (273) which in turn drives the mowing reel (13).

7. The reel lawn mower (10) of claim 6 including a clutch operator device spring return, wherein release of the clutch operator device (201) will allow a spring (230) to pivot a lever (227), decompressing the drive clutch assembly (81) to stop driving of the mowing reel (13) and drive section (15).

8. The reel lawn mower (10) of claim 1 wherein the cutting head (17) includes the mowing reel (13) and a bed knife (263) to effect grass cutting by shearing during rotation of the mowing reel (13), the mowing reel (13) is rotatably mounted to the frame (25), the mowing reel (13) includes a central longitudinal shaft (262) to which a plurality of blades (261) are attached, with the blades (261) extending helically along the length of the mowing reel (13), the blades (261) positioned to effect shearing action of grass between the blades (261) and the bed knife (263).

9. The reel lawn mower (10) of claim 8, Wherein at least one cutting height fixing member is provided in the form of a roller (281) to allow setting and fixing of the cutting height of the mowing reel (13) and bed knife (263).

10. The reel lawn mower (10) of claim 9 wherein the at least one cutting height fixing member is constructed and arranged to allow tool-less height adjustment of the roller (281) without tools, wherein the roller (281) is secured to a responder leg (291) of each of a pair of L-shaped arms (285), (287) respectively, each L-shaped arm pivotally secured to a respective side plate (33), (35), each L-shaped arm having an actuator leg (293), and a responder leg, the actuator leg (293) is connected together by a cross member (297) as by welding to effect simultaneous pivoting movement of the arms (285), (287) relative to the frame (25), an operator mechanism (301) is coupled to the cross member (297) as with a connector (303) secured to the cross member (297), a rigid link (305), is connected to the connector (303) and links a control operator in the form of a handle (307), to the cross member (297) and both arms (285), (287) to effect their simultaneous pivoting movement.

11. The reel lawn mower (10) of claim 1 including a pair of driving traction members (361), (363) mounted on an axle (351), each traction member (361), (363) includes an outer tread sleeve (367) mounted on a drive drum (369) in a manner to prevent relative rotation therebetween, the drive drum (369) is mounted on the axle (351) for selective relative rotation and selective non-relative rotation, a clutch assembly (391) provides cooperation between the axle (351) and the traction members (361), (363) to effect simultaneous driving of the traction members (361), (363) by the axle (351), but allows either traction member to freewheel during a turning maneuver of the mower (10) to effect driving of one of the traction members while allowing the other traction member to freewheel to compensate for the different turning radii of each driving traction member.

12. The reel lawn mower (10) of claim 11 wherein the clutch assembly (391) is a dual side acting assembly, with each side having similar construction, a gear (393), (395) is mounted to each respective traction member (361), (363) and is secured to the traction member as to be rotatable therewith so that the gears (393), (395) effect driving rotation of the traction members (361), (363), the gears (393), (395) are internal gears, each having a plurality of circumferentially spaced apart gear teeth (397) extending inwardly from an inside surface, and each presenting an engagement surface for selective contact with a ratcheting pawl (401), a hub (403) includes a radially extending flange (405) having opposite faces (407), (408), at least one pawl (401) is mounted on each face (407), (408) and is pivotal thereon, the pawls (401) are resiliently biased to an outward position to engage a respective tooth (397) to effect driving of a respective traction member (361), (363) in a forward direction.

13. The reel lawn mower (10) of claim 12 wherein the traction members (361), (363) preferably have a combined length of at least 75% of the spacing between the inside surfaces of the side plates (33), (35).

14. The reel lawn mower (10) of claim 13 wherein a space (419) between the adjacent ends of the traction members (361), (365) is less than 1 inch or 2.54 centimeters.

15. The reel lawn mower (10) of claim 1 including a grass catcher (451) removably mounted to the frame (25), and positioned for receiving cut grass clippings from the reel (13).

* * * * *